(12) United States Patent
Pelletier

(10) Patent No.: US 11,233,795 B2
(45) Date of Patent: Jan. 25, 2022

(54) DATING SYSTEMS AND METHODS WITH ENHANCED PERSONAL SECURITY FEATURES

(71) Applicant: Kevin Pelletier, Denver, CO (US)

(72) Inventor: Kevin Pelletier, Denver, CO (US)

( * ) Notice: Subject to any disclaimer, the term of this patent is extended or adjusted under 35 U.S.C. 154(b) by 249 days.

(21) Appl. No.: 15/984,495

(22) Filed: May 21, 2018

(65) Prior Publication Data

US 2018/0337928 A1 Nov. 22, 2018

Related U.S. Application Data

(60) Provisional application No. 62/509,467, filed on May 22, 2017.

(51) Int. Cl.
| | | |
|---|---|---|
| *H04L 29/06* | (2006.01) | |
| *G06F 16/9535* | (2019.01) | |
| *G06F 16/9537* | (2019.01) | |
| *H04W 12/10* | (2021.01) | |
| *H04W 4/21* | (2018.01) | |
| *G06Q 50/00* | (2012.01) | |

(52) U.S. Cl.
CPC ........ *H04L 63/102* (2013.01); *G06F 16/9535* (2019.01); *G06F 16/9537* (2019.01); *H04L 63/108* (2013.01); *H04W 4/21* (2018.02); *H04W 12/10* (2013.01); *G06Q 50/01* (2013.01)

(58) Field of Classification Search
CPC ...... G06F 16/29; G06F 16/9535–9537; G06Q 30/0205; G06Q 50/01; H04L 63/102; H04L 63/107; H04L 63/108; H04L 67/18; H04L 67/22; H04M 1/72572; H04M 3/42348–42357; H04M 2242/30; H04W 4/021–022; H04W 4/025–029; H04W 4/21; H04W 12/00503; H04W 12/10; H04W 12/1004; H04W 64/00–006
See application file for complete search history.

(56) References Cited

U.S. PATENT DOCUMENTS

| | | | | |
|---|---|---|---|---|
| 2015/0163258 A1* | 6/2015 | Garcia, III | ............ | H04L 51/043 709/204 |
| 2015/0249904 A1* | 9/2015 | Weiss | .................... | H04W 4/027 455/456.1 |
| 2016/0234651 A1* | 8/2016 | Marcus | .................. | G06Q 50/01 |
| 2021/0174566 A1* | 6/2021 | Lotto | .................... | H04W 4/021 |

OTHER PUBLICATIONS

"Popular times, wait times, and visit duration—Google My Business Help". Google Business Help, Answer #6263531. Captured by The Wayback Machine on Nov. 8, 2017. <https://web.archive.org/web/20171108014151/https://support.google.com/business/answer/6263531> (Year: 2017).*

* cited by examiner

*Primary Examiner* — Kevin Bechtel
(74) *Attorney, Agent, or Firm* — Capitol Patent & Trademark Law Firm, PLLC

(57) ABSTRACT

Improved systems, devices and methods, that allow people to meet, incorporate enhanced personal security measures that are completed before the identity of one user (e.g., a female user) is disclosed to another user (e.g., a male user).

10 Claims, 11 Drawing Sheets

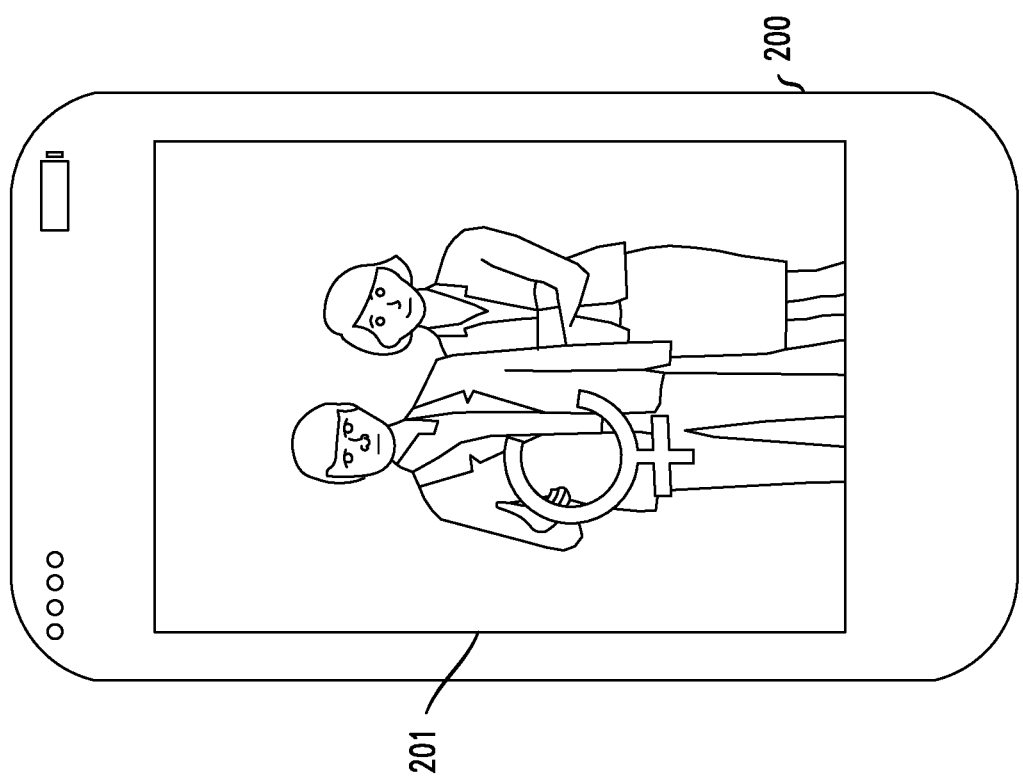

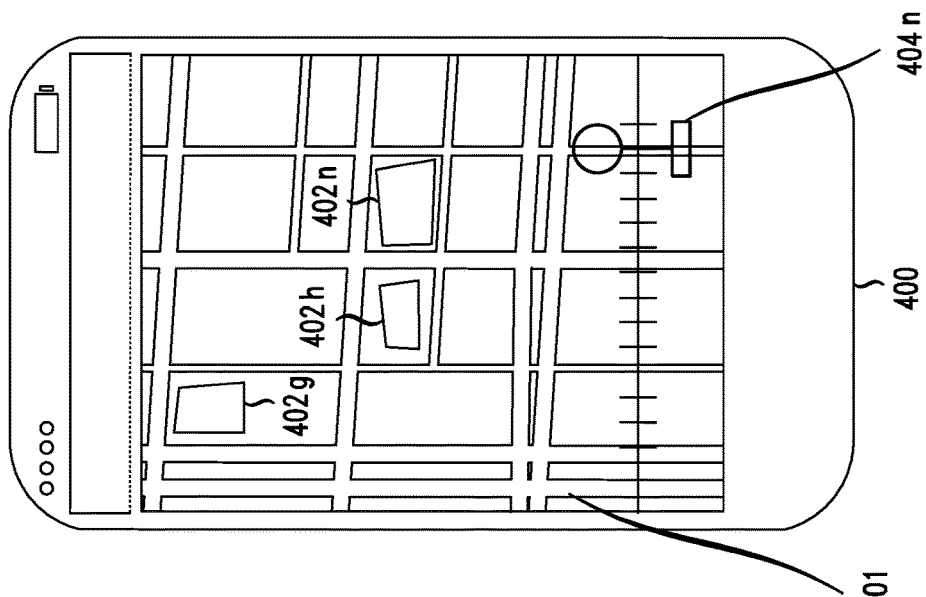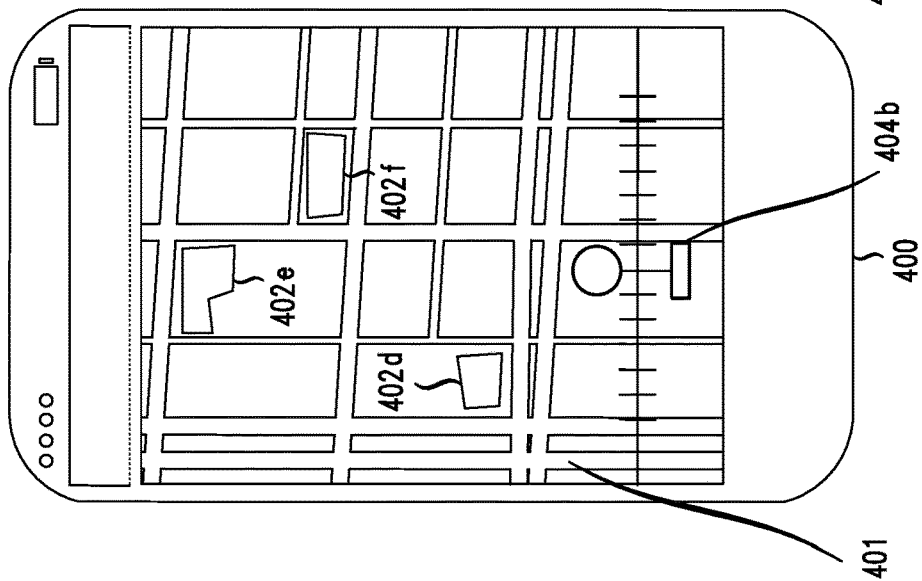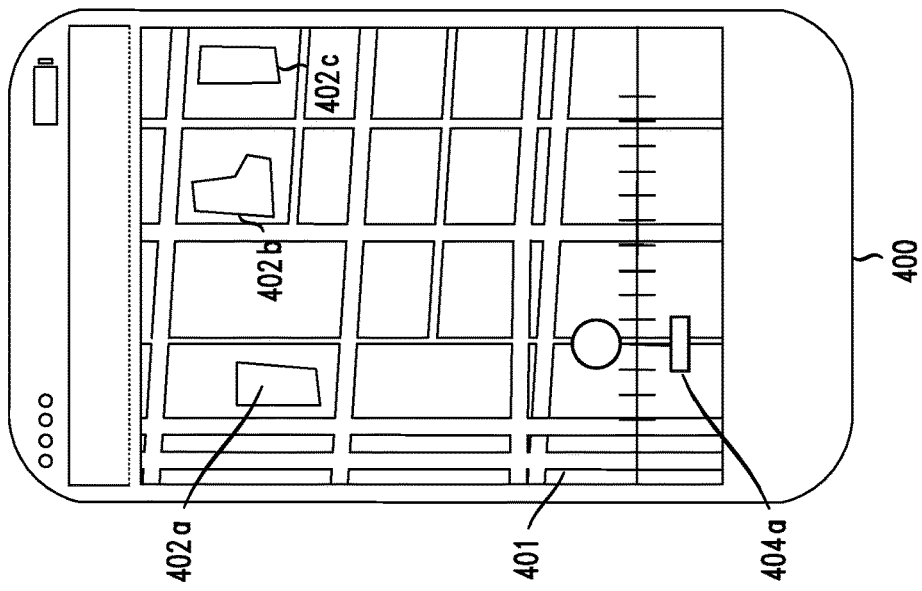

DATING SYSTEMS AND METHODS WITH ENHANCED PERSONAL SECURITY FEATURES

RELATED APPLICATION

This application claims priority to U.S. Provisional Patent Application No. 62/509,467 filed May 22, 2017 (the "'467 Application") and incorporates by reference herein the entire disclosure of the '467 Application as if set forth in full herein.

INTRODUCTION

Today's generation of millennial singles (unmarried individuals, typically between the ages of nineteen and early thirties) have a number of mobile dating applications that they can use to meet other singles. However, the vast majority of these existing applications and similar websites (collectively "existing methods") provide a lengthy, tedious process of communication. Typically, one person digitally flirts with another until the other person is finally convinced that it is worthwhile investing the time to actually meet the person who is flirting. Many times, this process takes a lot of time, and even if two people decide to meet, by the time they decide to do so they may be geographically remote from one another, or so far away from each other that meeting becomes impractical.

Applications like 'Tinder' and 'Bumble' do a good enough job of linking interested parties to each other (based primarily on physical interest), but they do little to enable such parties to easily, physically meet each other. People who use such applications have also complained that these applications erode the genuine means of dating from 'yesterday,' and are creating generational problems with singles by incentivizing fleeting and temporary moments of euphoria.

Other applications like 'Sonar,' and 'Highlight' have attempted to address some of the issues with the more popular dating applications but have failed to garner enough subscribers to make their applications popular enough to change the way in which the more popular applications operate. These applications attempt to allow people to post their real-time locations, however they do not provide sufficient personal security features or procedures to make people feel comfortable to use such applications.

Accordingly, the present invention provides for novel and non-obvious improvements over existing dating applications and methods by incorporating enhanced personal security measures that are completed before the identity of one user (e.g., a female user) is disclosed to another user (e.g., a male user), where such measures involve a straightforward and uncomplicated process.

BRIEF DESCRIPTION OF THE DRAWINGS

FIG. 2 depicts an exemplary display that is generated by a stored application (hereafter "APP") and associated circuitry according to an embodiment of the present inventions.

FIGS. 4A to 4C depict exemplary displays of maps or grids generated by devices according to embodiments of the present invention.

SUMMARY

Figure 1A:
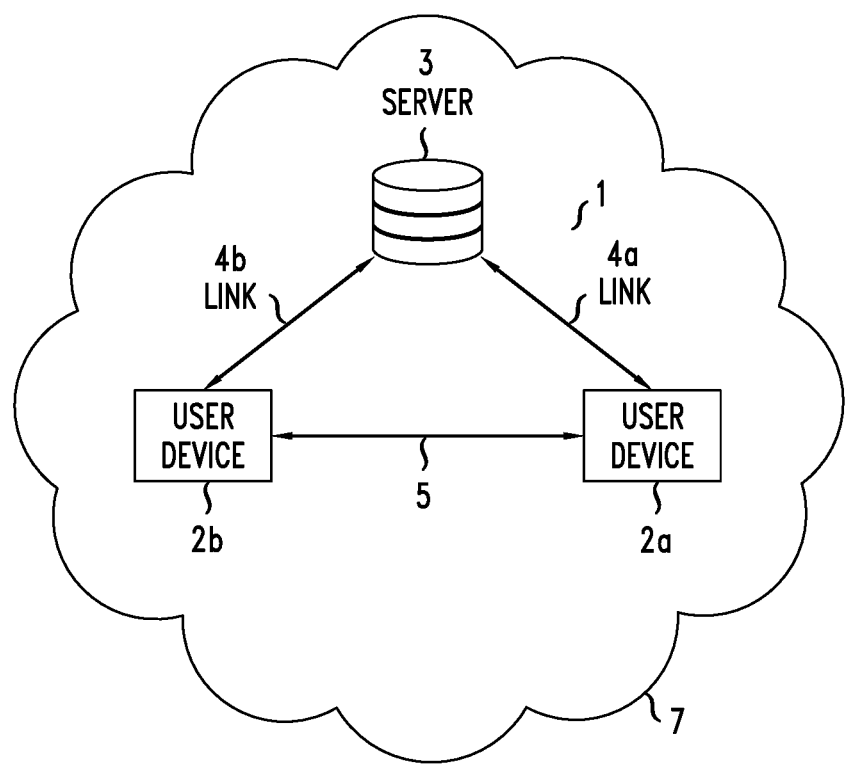
FIG. 1A depicts a simplified diagram of a network that includes systems and devices according to embodiments of the invention.

Systems and methods for providing real time, dating services to users are described herein. In one embodiment, real time, simplified biographical information (e.g., profiles) of geographically proximate users may be exchanged using enhanced personal security features in order to provide safe and secure matchmaking.

Some features of embodiments of the present invention include: (i) permitting a user to vary the area or areas (referred to as "active area(s)") within which his or her personal profile will be disclosed to another user (or users), where the active area selected by a user may be less than the total area allowed by an application, or less than the total area subscribed to by the user or less than a total profile area, for example; (ii) the requirement that certain users, such as male users, authenticate themselves and their profiles in order to meet other users (i.e., female users) using enhanced personal security features by requiring, for example, them to take a picture of themselves and sending such a picture to a female user before a match occurs (e.g., before the female user's identity and location is disclosed to the male user); (iii) allowing male users to broadcast their identity and profiles using "echo request" signals (messages) to female users within a geographic area that may be varied by the male user; (iv) providing female users with the ability to control the final decision as to whether or not they wish to meet or communicate with a male user, and (v) allowing female users to remain anonymous until such time as they choose to disclose their identity and/or profile to a male user.

Some exemplary embodiments include, but are not limited to: a server (electronic hardware device or devices) operable to control communications between user devices and control access to an identity and profile of each user of each user device, allow communications from a first one of the user devices (first device) to a second one of the user devices (second device) and disallow communications from the second device to the first device, and allow the first device to access a profile associated with a second user of the second device and disallow access to a profile of a first user of the first device by the second device, wherein the first and second users are of the opposite sex.

In additional embodiments the server may be further operable to allow communications from the first device to the second device when the first user is a female user and disallow the communications from the second device to the first device when the second user is a male user, until such time as enhanced personal security measures have been satisfied, and/or allow the first device to access a profile associated with the second user when the first user is a female user and disallow access to a profile of the first user by the second device when the second user is a male user until such time as enhanced personal security measures have been satisfied.

The exemplary server may be further operable to (i) compute estimated user per area densities from stored historical data or content or a combination of the historical data and a computed number of users, and send the computed densities to one or more of the user devices; and (ii) control the size of an area within which a request, from a user of one of the user devices, is sent to another user of another one of the user devices.

In addition to servers, the present invention provides for a user device (or devices), where the device (or each device) may be operable to create or access a profile, select an area within which a user of the device is, or will be present within, or nearby, and create one or more density areas, each area representing an estimate of a number of users expected to be within a given density area at a certain time.

Such an exemplary user device (or devices) may be further operable to: (i) select a date, time or time frame that the user will be present within, or nearby, the user area, where the profile may comprise a plurality of text, images, videos and audio content; (ii) display a map that comprises the one or more density areas, and the number of users within the density areas, and/or display a location of the user of the device on the map; (iii) receive signals from a central server, where the signals comprise data or content representative of the number of users expected to be in a geographical area at a certain time, and generate the one or more density areas based on the data or content; (iv) generate a signal that includes information that identifies a general location of the user of the device, send the signal to a selected, second user associated with a selected second profile, and receive authentication information from a device of the second user within a certain elapsed time, where the authentication information comprises a selfie of the second user, and the elapsed time is 60 seconds or less; (v) send an identity of the user to the device of the second user upon receipt of the authentication information within the certain elapsed time period; and (vi) output a signal indicating the device is nearby the user area or one of the density areas or not nearby the user area or one of the density areas.

In additional embodiments, the user device (i.e., each device) may be operable to receive and display information regarding the number of anonymous users that are within a certain area surrounding a present location of the user, or a future location of the user, and/or display an indication of an area containing a number of the anonymous users that exceeds a first threshold value or display an indication of an area containing a number of the anonymous users that falls below a second threshold value.

In yet another embodiment, such an exemplary user device may be further operable to (a) generate a request signal that comprises information identifying the location, identity and profile of the user of the device, and send the request to one or more devices of one or more second users within a variable geographical area, (b) vary the size of a displayed indicator in order to vary the size of the variable geographical area.

In addition to the servers and user devices described herein, the present invention may provide for system that provides enhanced personal security measures, where the system may comprise at least: (1) a server operable to control communications between user devices and control access to an identity and profile of each user of each user device, allow communications from a first one of the user devices (first device) to a second one of the user devices (second device) and disallow communications from the second device to the first device, and allow the first device to access a profile associated with a second user of the second device and disallow access to a profile of a first user of the first device by the second device, wherein the first and second users are of the opposite sex; and (2) at least first and second devices, each device operable to create or access a profile, select an area within which a user of the respective device is, or will be present within, or nearby, and create one or more density areas, each area representing an estimate of a number of additional users expected to be within a given density area at a certain time.

DETAILED DESCRIPTION, INCLUDING EXAMPLES

Exemplary embodiments of dating methods and systems via communication networks using enhanced personal security features are described herein in detail and shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention. Further, though specific structural and functional details may be disclosed herein, these too are merely representative and used for the purpose of describing the exemplary embodiments.

It should be noted that some exemplary embodiments are described as processes or methods (collectively "method" or "methods"). Although a method may be described as a series of sequential steps, the steps may be performed in parallel, concurrently or simultaneously. In addition, the order of each step within a method may be re-arranged. A method may be terminated when completed and may also include additional steps not described herein.

It should be understood that when the terms access, click, create, determine, display, establish, generate, input, outline, output, present, provide, receive, select, send, and transmit are used herein, as well as other action or functional terms, and their various tenses, that such actions or functions may be implemented or completed by a physical hardware electronic device (e.g., smartphone, laptop computer, tablet, desktop computer) that includes one or more processors (collectively referred to as "processor") operable to execute instructions stored in one or more memories (collectively referred to as "memory") in association with data stored in memory and/or in accordance with signals received from a central hardware electronic device or devices (e.g., central server or just "server" for short) to complete such actions and functions. Such a central server may itself include one or more processors and memories to complete the features and functions described herein. Further, it should be understood that the hardware electronic devices described herein further comprise the necessary additional electronic circuitry known in the art to complete the functions, features, processes and methods described herein, such as touchscreen displays, audio and speech converters, amplifiers, transmission and reception circuitry, signal drivers, etc.).

One such hardware electronic device may be used by a user (an individual that uses an inventive system, device or method). The instructions stored on such a user device or signals downloaded from a central server may comprise an application ("APP"). In more detail, it should be understood that a user device that completes features and functions of embodiments of the invention may include a web browser that is a part of an interface or one or more APPs that have been installed into, or downloaded onto, a system or device. An APP may include "content" (e.g., text, audio, image and video files), signaling and configuration files. For the sake of convenience and not limitation, the terms APP or "application" are used herein to refer to an inventive application but use of such a term also includes a reference to any file or data used by an embodiment of the invention.

In one embodiment, an APP to be downloaded onto a user device may reside or be stored on one or more central servers in whole and/or in part, the later indicating that the APP may be distributed among, and by, a number of devices (servers). An APP may be downloaded to a user device from a particular type of central server, called an applications server (or servers as the case may be) or have been otherwise provided and installed on such a device. A given user device may have a need for one or more of APPS installed on a server. Accordingly, it should be understood that each of the embodiments described herein includes protocols, necessary hardware, software and firmware resident on a user device for transmitting and receiving an APP, content and/or content identification information relating to the APP from/to a server and vice-versa. It should be understood that depending on the content to be transmitted, an APP may be installed directly on a user device or may be downloaded from a server by initiating a request to a server to receive a local copy of the APP.

Yet further, it should be understood that when a feature or function is described herein as being completed by a user device that such a feature or function may be alternatively completed by a central server, or vice-versa, depending on the context of the feature and function being described.

As used herein, the term "and/or" includes any and all combinations of one or more of the associated listed items. As used herein, the singular forms "a," "an" and "the" are intended to include the plural form, unless the context indicates otherwise.

As used herein the term "user" may refer to a single user, or a plurality of users, or a single user device, or a plurality of user devices depending on the context.

It should be understood that each of the embodiments of the invention described herein and their associated hardware electronic devices (e.g., central server, user device) are configured with the necessary circuitry, instructions and data to enable each to process information much faster than humanly possible and to exchange information much faster than humanly possible. That is to say, each of the embodiments of the present invention cannot practically be implemented in any amount of time that would be acceptable to one skilled in the art using human beings as substitutes for the systems and devices described herein. For example, some of the embodiments described herein involve an exchange of information via a communications network between a physical user device and network device (central server) that are remotely located from one another, where the information exchanged must be available for immediate display to a user involved in the exchange of information. Accordingly, the speeds at which the information is exchanged, and the amount of information exchanged is many times faster than can be communicated and processed by the human mind. Nor can such information be displayed by the human mind or mechanical means (pen and paper) within the time periods demanded by users of the present invention and those skilled in the art of the present invention.

As used herein, the term "embodiment" refers to an embodiment of the present invention.

Referring now to FIG. 1A there is depicted a simplified network 7 that includes one or more central servers 3 and one or more user devices 2a,2b according to embodiments of the invention. In an embodiment, the one or more servers 3 may be operable to include (i.e., "host") one or more databases for storing one or more APPs provided by the present invention and any related data, signaling and content. Further, in an embodiment the one or more servers 3 are operable to exchange signaling and data with each of the user devices 2a, 2b in order to provide the devices 2a,2b access to the stored APP thru a registration process (e.g., initial authorization and authentication, creation of a user login and password). In addition, the servers 3 may be operable to exchange signaling, data and content with each user 2a, 2b via respective links or channels 4a, 4b to allow each user to create a user profile that may be stored on each device 2a, 2b as well as within the servers 3. Still further, the servers 3 may be operable to control communications between user devices 2a, 2b and access to the identity and profile of the user of each user device 2a,2b. For example, in one embodiment, the servers 3 may be operable to allow communications from user device 2a (e.g., a device used by a female user) to user device 2b (a device used by a male user) and (or "but") disallow communications in the opposite direction entirely, or until such time as enhanced personal security measures described elsewhere herein have been satisfied. Similarly, the servers 3 may be operable to allow user device 2a (e.g., a female user) to access a profile associated with the male user of device 2b and (or "but") but disallow access to a profile of the female user of device 2a by the male user of device 2b entirely, or until such time as enhanced personal security measures described elsewhere herein have been satisfied.

Said another way, and as described in more detail elsewhere herein, an authorized male user associated with device 2b will not be able to directly communicate with device 2a and its female user using the inventive systems, devices and methods until such time as the female user of device 2a grants the male user permission to do so. In an embodiment, a female user of device 2a may grant such permission by, for example, (i) sending a confirmation signal, referred to herein as an echo confirmation signal or just confirmation signal, to device 2b used by a male user and (ii) receiving authentication information from the male user of device 2b.

Figure 1B:
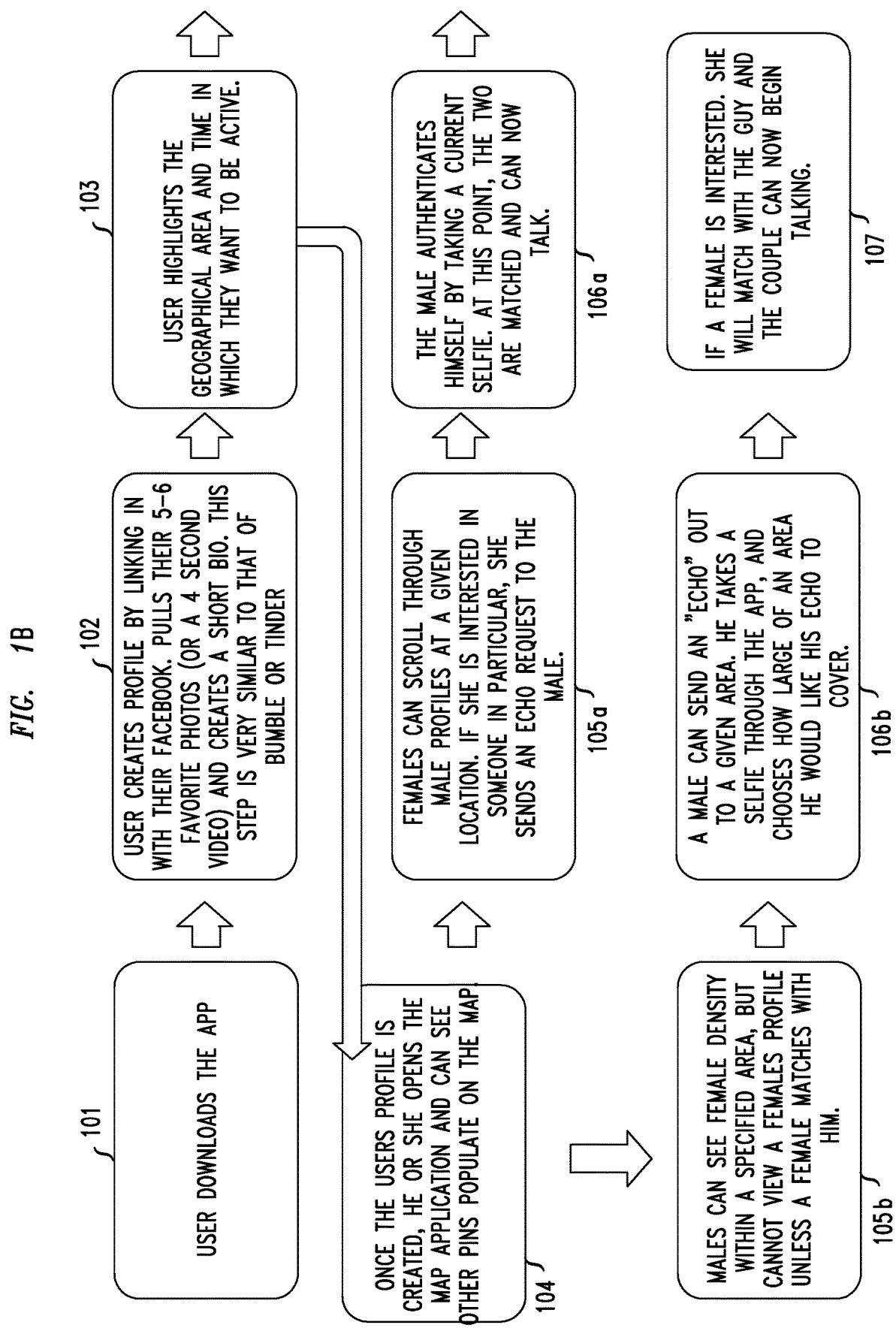
FIG. 1B depicts a simplified outline of an exemplary method according to embodiments of the present invention.

Referring now to FIG. 1B there is depicted a simplified flow diagram of a method that may be used by the system 1, and devices 2a,2b illustrated in FIG. 1A (as well as other devices described elsewhere herein) according to an embodiment of the invention. As shown the exemplary method comprises 101 during which a user device 2a,2b downloads an APP from a central server 3 or otherwise accesses a web site (such as a site represented by a home page) using a browser and the like on a device 2a,2b such as a handheld smartphone 200 depicted in FIG. 2 to name just one of many possible devices.

In accordance with an embodiment, in step 102 the user may create a profile by, for example, following the instructions presented to the user on device 200 (or 2a,2b) through the APP by, for example, selecting a "profile" tab or the like to name just one method of inputting profile information. Alternatively, once the user has accessed the APP, and initiated the creation of a profile the user may access an existing profile that has already been created and stored on their device or another social network site, such as Facebook, through the device's 200 (or 2a,2b) browser for example. The information from the existing profile may be transferred to the APP and used to create the profile by, for example, copying and pasting from the accessed site into a profile creation input page ("input page"), or by inserting a link to the site into the input page, or otherwise using information from the site to complete the input page. As a part of creating a profile, the user may insert or otherwise include one or more images, such as a picture (element 201 in FIG. 2) of the user himself/herself from an existing social network site, in the input page. The profile created by the user may contain a plurality of text, images, videos and audio content as desired by the user.

In step 103 a user may select or outline a geographical area 302 (see FIG. 3B) within which certain features of the APP will be enabled. Such an area may be referred to as an "active area". In one embodiment, this selection may be completed during a profile-setup stage, and may be adjusted at any time that the user desires. It should be understood that the active area 302 may be adjusted or varied by the user (male or female user). Further, the active area 302 may be a subset (i.e., smaller) area of the total area 301 within which features of the APP may be used (e.g., the user subscribes to use the APP in the entire Washington, D.C. area, and (or "but") selects a specific, smaller area 302 at any given time).

Figure 3A:
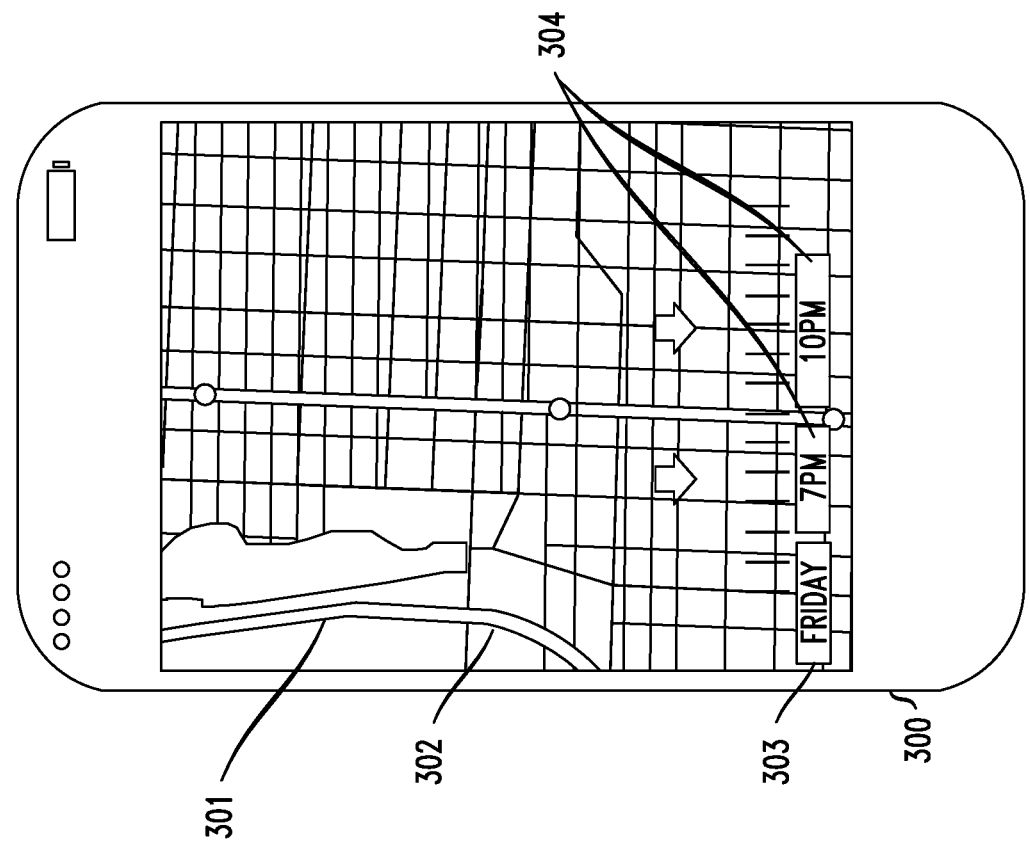
FIGS. 3A and 3B depict exemplary displays that include an indication of one or more active areas within which a user may be present in accordance with an embodiment of the present invention.
Figure 3B:
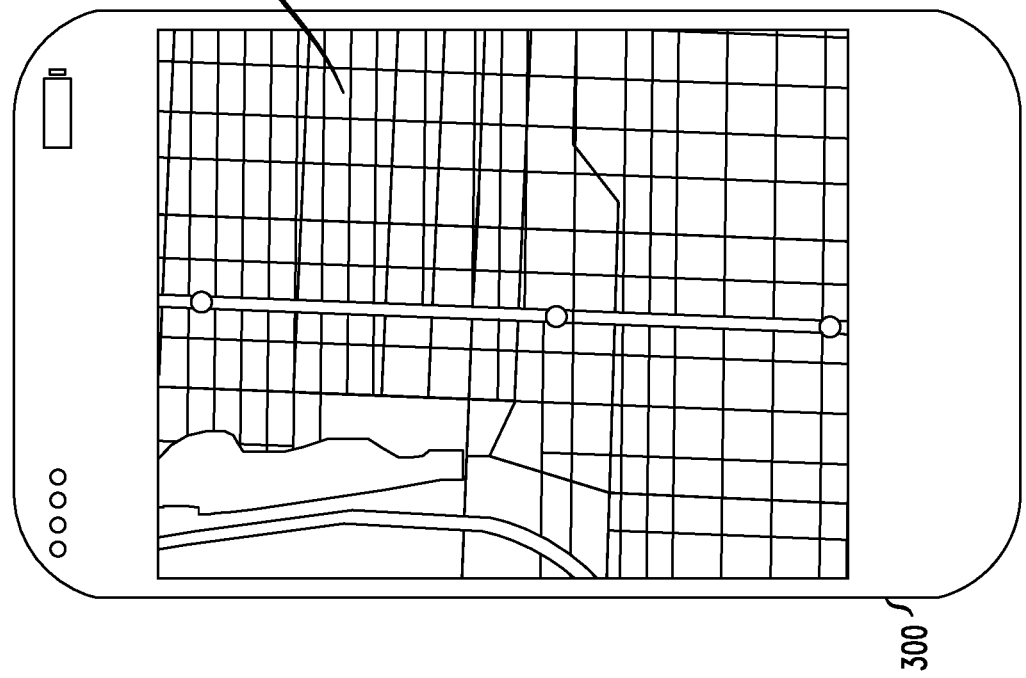

Continuing, in addition to selecting (e.g., by highlighting) a geographical area 302 displayed on a device 300 (or 2a, 2b, 200), within which the user will be present within, or nearby, the user may also select a date 303 time 304 (or time frame) that the user will be so present within, or nearby, the active area or geographical location 302 (see FIG. 3). As used herein the word "active time" will be used to indicate a time that the user will be within the selected active, geographical area 302 and looking to meet another user (e.g., if the user is a man, the individual may be a woman).

In an embodiment, the user may select the active area 302 by accessing the APP on device 300 (or 2a,2b, 200) through input means such as a keyboard, touch-screen, stylus, microphone and speech conversion circuitry to name just a few of the means by which the user of device 300 may input instructions to create, delete or change area 302 or an associated date and time. It should be understood that the user need not necessarily be within the selected area 302 at the time it is created, deleted or changed.

In embodiments of the invention, devices covered by embodiments of the present invention may include the necessary circuitry, stored instructions and data to complete the features and functions just described (as well as the other features and functions described herein). For example, such devices may include GPS, and RFID circuitry, instructions and data.

Those skilled in the art will readily recognize that the ability to select an active area, date and time is both novel and non-obvious. To date, the inventor does not know of another technology or service that enables a user to select the geographical area, date and time within which (and during which) the user will be socially active, where the active area is not the same as the total available area covered by the APP itself (sometimes referred to as a profile area). In one example, while a profile area may be 100 miles in radius, an active area may only be a small subset of that, such as a few hundred square feet.

In step 104 of the exemplary embodiment outlined in FIG. 1, once the user has created a profile the user may open or otherwise access an exemplary "map" (or grid) page 401 (see FIGS. 4A to 4C). In an embodiment of the invention, the map page 401 may be displayed to the user on the screen of a device 400 (or 2a, 2b, 200, 300). In addition, the map page 401 may include one or more density areas 402a-n (where "n" represents the last density area). In an embodiment, a density area 402a-n is an area within which a number of other users are present at a given time or time period 404a-n (where "n" represents the last time or time period) which may also be simultaneously displayed with a density area 402a-n on the device 400. In addition, a date (e.g., day, day/month, day/month/year) may also be displayed along with the time (not shown in figures for the sake of simplicity). In an embodiment, a minimum number of users per a reference area may be used by the APP to determine a first density value (e.g., users/square foot or square meter). A plurality of density values may be computed by the APP, for example, where one value may represent a low-density value, and another may represent a high-density value. Further, in embodiments of the invention, each density area 402a-n may be displayed in a different color, where each different color is associated with a different density value. In general, each density area 402a-n associated with the substantially same density value may be associated with a similar indicator (e.g., color). In more detail, the APP stored on the device 400 may, for example, be operable to receive signals from a central server 3 (see FIG. 1A), where the signals include data or content representative of density measurements (e.g., users/square foot or square meter). Thereafter, the APP stored on the device 400 may be operable to use the data or content to generate the density areas 402a-n.

In an additional embodiment, the central server 3 may be operable to compute the number of current users and their current location and send such data and content to the device 400 where the device 400 may use the data and content to create and display the density areas 402a-n. The central server 3 may access instructions as well as data and content stored as electrical signals in its memory to complete such computations.

Yet further, the central server 3 may store historical data regarding the number of users that are typically found within a given area. Thereafter, the central server 3 may be operable to compute estimated densities (i.e., forecasted densities) from the stored historical data or content or a combination of historical and real-time data, and content and send the forecasted data to the device 400. Upon receiving data or content from the central server 3, the device 400 may be operable to create a density area 402a-n that represents an estimate of the number of users that are expected to be within a given geographical area at a certain time 404a on a certain day, for example. In an embodiment, the user of device 400 may, or may not, be located in the vicinity of one or more of the areas 402a-n at the time the areas are displayed to the user. In this way, embodiments of the present invention allow a user to understand what areas in their local vicinity are popular throughout different times of the day (e.g., time or time period 404a-n), and different days of the week and months of the year (e.g., on a Friday night, on a holiday).

Step 105a in FIG. 1B can be explained with reference to FIGS. 5A and 5B which depict an exemplary map or grid 502 displayed on device 500 that includes indicators 501a-n (where "n" represents the last indicator) overlaid, for example, on top of the map or grid 502. One way in which the indicators 501a-n may be used is by a female user of device 500 (or 2a). For example, the indicators 501a-n provide an indication to a female user as to the location of male users (i.e., devices used by male users), and provides her with access to their profiles.

In an embodiment, each of the indicators 501a-n is associated with a user at a given location (e.g., address) in proximity to the user of the device 500. Also, overlayed is the position 505 of the user of device 500. Accordingly, the user of device 500 will be able to determine the location of each of the users associated with indicators 501a-n with respect to her location 505 (e.g., how far away each male user is from a female user) as well as their proximity to a plurality of facilities 504a-n (where "n" represents the last facility) such as bars, restaurants, residences, etc. . . . at a given period of time and/or date. Though time or time period indicators, such as indicators 404a-n described previously, are not shown in FIGS. 5A and 5B for the sake of simplicity, it should be understood that such indicators may be included within the embodiments illustrated in FIGS. 5A and 5B. In fact, it should be understood that the features depicted in any one of the figures described herein, or simply in a textual embodiment described herein, may be included in one or more of the other figures or textual embodiments described herein. For the sake of avoiding redundancy the inventors have refrained from repeating such features for each figure or embodiment.

Continuing, in an alternative embodiment, the relative location of a user associated with indicators 501a-n may initially be displayed on the map or grid 502 while a more detailed description (e.g., address) may be displayed elsewhere on the display of device 500 or accessed through a drop-down menu accessible by selecting an indicator 501a-n, for example. In yet another embodiment, if the user (e.g., female user) is not yet located within the geographical area associated with the map or grid 502, the device 500 (e.g., APP stored on the device 500) may be operable to track the location of the female user using known GPS methods and display her location when the user enters the map or grid 502. Alternatively, the user can enlarge the area associated with the map or grid 502 to include her present location. The location of the female user with respect to the map or grid 502 may be continually updated and displayed on device 500 using known GPS methods.

More particularly, each of the indicators 501a-n may be associated with a male user that has downloaded or otherwise accessed the same or similar APP, while the device 500 may be associated with a female user. The displayed indicators 501a-n (as well as 505) may take many forms, including a "pin" to name just one type of exemplary indicator. In embodiments of the invention, the users associated with the indicators 501a-n may be registered users of a service (free or subscription based) that includes the same or similar APP being used by the female user of device 500, for example. Along with an indicator 501a-n, 505 for each male or female user, the device 500 may be operable to display an image (e.g., picture) or other visual content 503a-n (where "n" represents the last profile shown) from each male user's profile associated with each displayed indicator 501a-n as well as a picture of the female user.

Figure 5A:
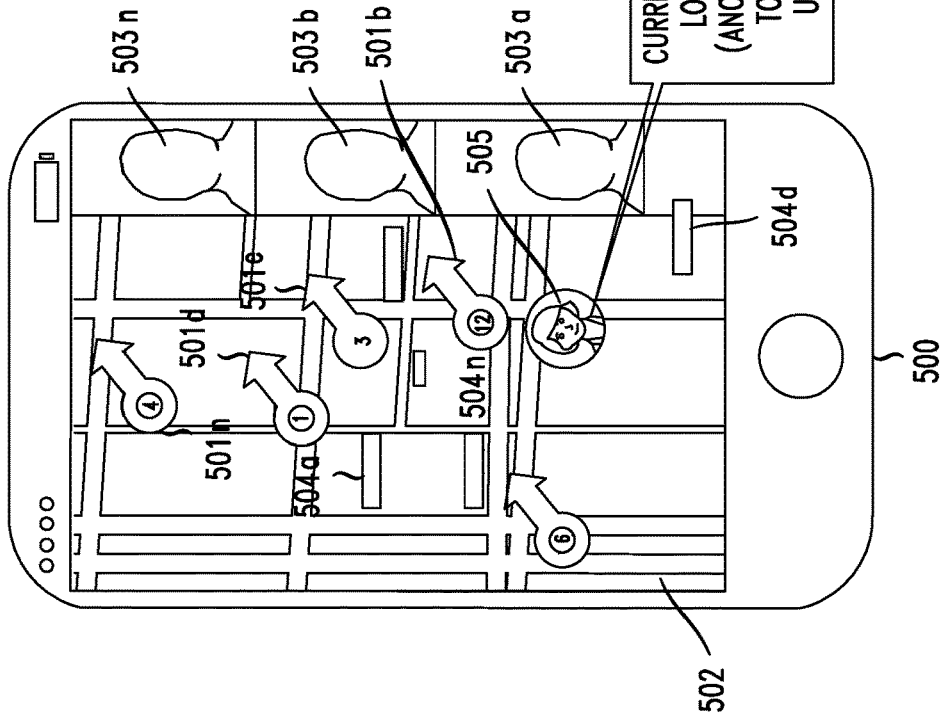
FIGS. 5A and 5B depict exemplary displays of a device used by a user according to an embodiment of the invention.
Figure 5B:
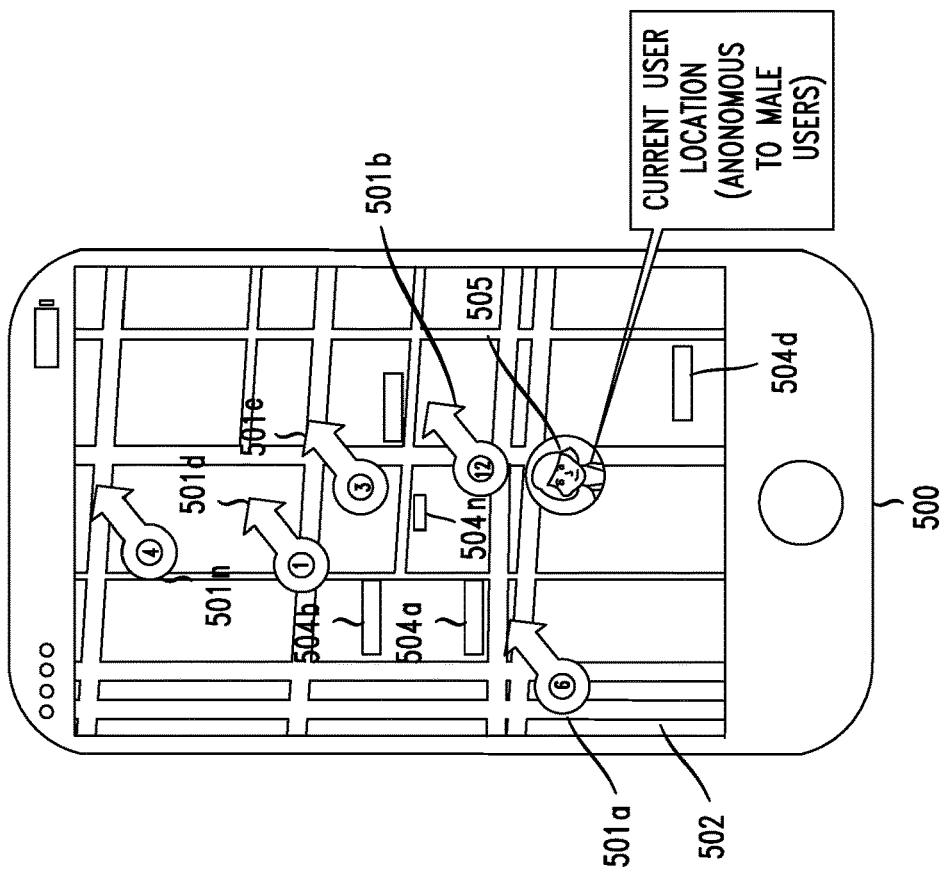
Figure 6A:
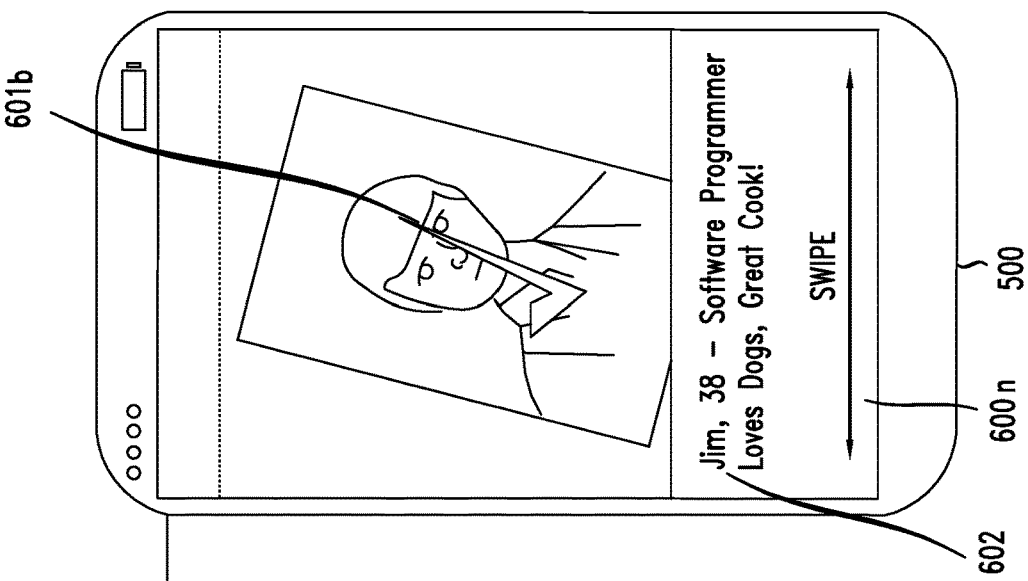
FIGS. 6A to 6C depict exemplary profiles of users that may be presented to another user in accordance with an embodiment of the present invention.
Figure 6B:
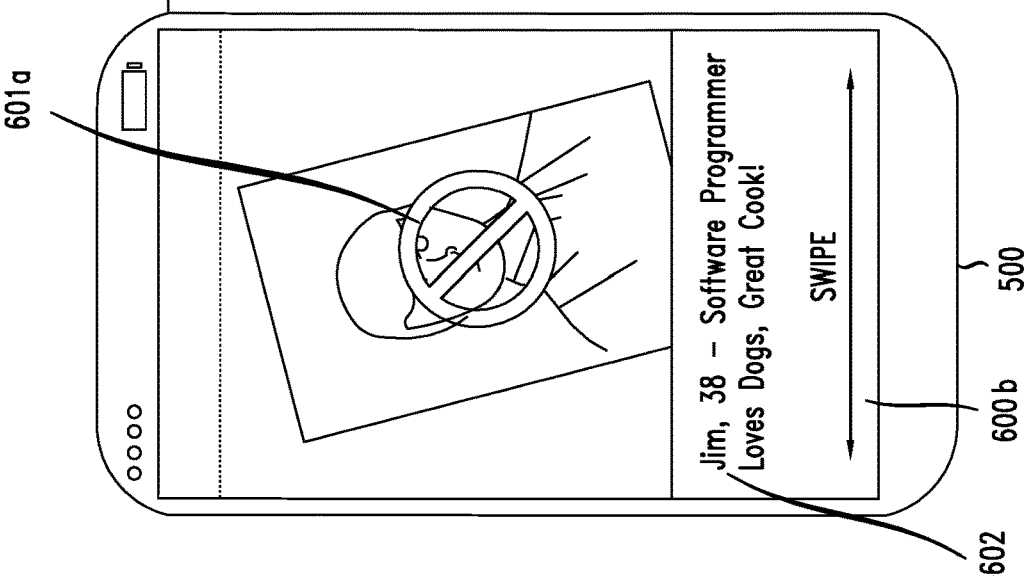
Figure 6C:
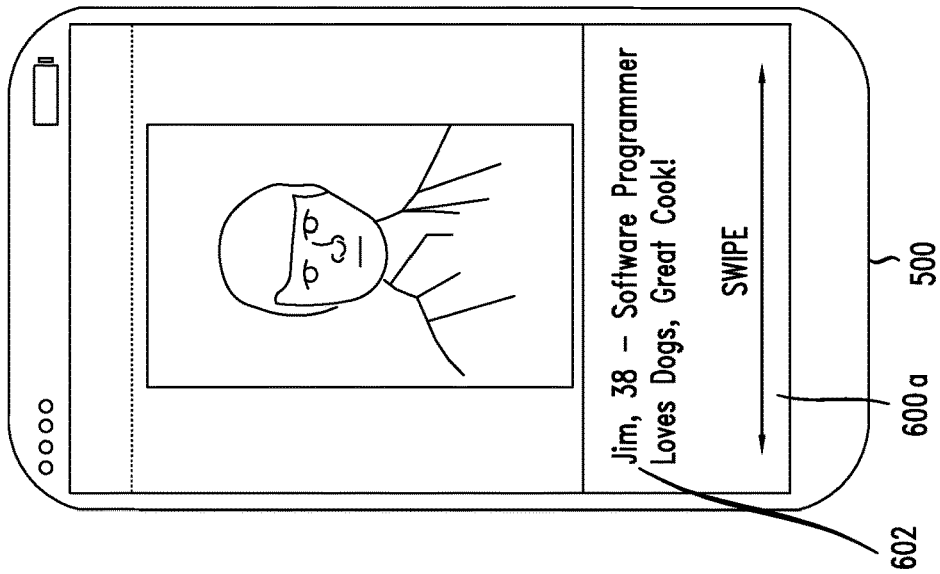

The embodiments illustrated by FIGS. 5A and 5B and step 105a provide an enhanced amount of security for a female user, because while the female user of device 500 can see the location of male users, the male users cannot see the location 505 of the female user (i.e., of the female user's device 500). In this embodiment, the device 500 may be operable to receive input by the female user that indicates the female user has selected one or more male users by, for example, by clicking on an indicator 501a-n or content 503a-n associated with a male user. In response, the device 500 may display additional information associated with each selected male user, such as a profile of each male user that has been previously created by the selected male users. In this manner, the female user of device 500 may view the profiles of the selected male users in order to determine if the female user is interested in communicating with the selected male users. FIGS. 6A to 6C depict a number of exemplary male profiles 600a-n (where "n" is the last profile) that may be presented to the female user on device 500, where the profiles 600a-n are associated with selected male users (i.e., the pins 501a-n associated with such male users). The exemplary male profiles 600a-n may include a plurality of information about the respective, selected male user (e.g., age, images, videos of the male user and other people, short biography) which can be reviewed by the female user of device 500 in order to determine if the female user wishes to communicate with one of the selected male users.

In an embodiment, the female user of device 500 may view the profiles 600a through 600n and select which profile she is most interested in by, for example, clicking on those profiles 600a-n she finds acceptable or swiping the display 602 depicting the acceptable profile to the right or left. Similarly, to reject a profile, the user may click on the profile at a certain position (upper righthand corner) or swipe the display 602 depicting an unacceptable profile to the left or right (i.e., opposite direction as accepting a profile). In addition, once the user has so selected an acceptable profile 600n, or rejected a profile 600b, the selected/rejected profile may be marked with an indication 601a, b that is associated with a selected profile (601b) or rejected profile (601a).

Upon viewing the profiles of one or more male users and selecting those male users she wishes to communicate with further, the female user of device 500 may select or otherwise initiate an "echo confirmation request" or, more generally, a confirmation signal by selecting an icon, for example, that is displayed on a screen of her device 500 or by selecting a dedicated pushbutton of some kind that is made a part of the device 500. In any event, upon receiving an input signal from the selected pushbutton or icon, the device 500 may be operable to generate a confirmation signal that includes information that identifies a general location (i.e., not an exact address) of the female user a push notification indicating to a male user that 'Somebody at Smith's restaurant is interested in you!') and sends this signal to a selected male user (e.g., one whose profile the female user is interested in).

Figure 7A:
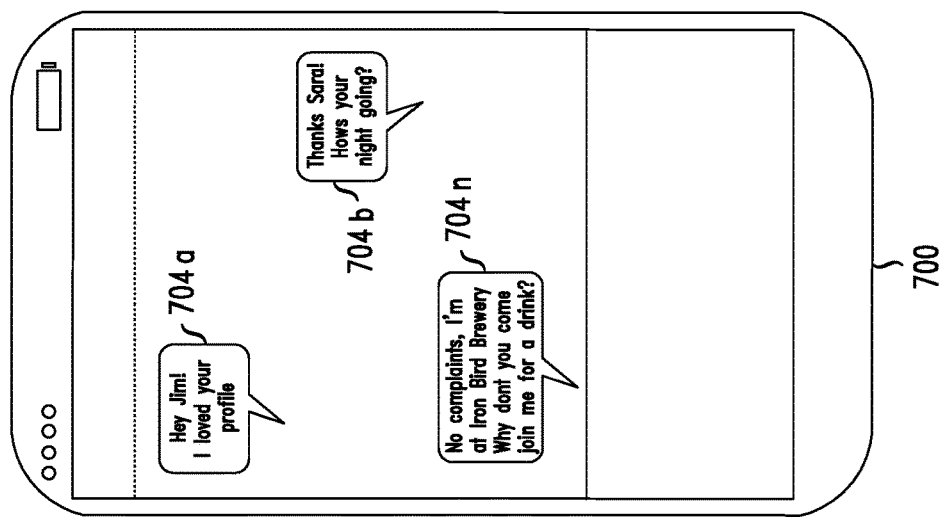
FIGS. 7A to 7C depict exemplary displays that may be generated by devices in accordance with embodiments of the present invention.

Step 106a in FIG. 1 and FIGS. 7A to 7C provide a description of the process that may follow the generation and transmission of a confirmation signal. In FIG. 7A, a device 700 (2b in FIG. 1A, e.g., handheld smartphone, laptop, tablet) operated by a male user that has been sent a confirmation signal ("male recipient") may be operable to receive the confirmation signal and display an indication 801 that the confirmation signal has been received on the screen of the device 700 (see FIG. 8). In an embodiment, the male recipient may respond by inputting authentication information into the device 700 or otherwise select such authentication information that is already stored on the device 700. The device 700 may be operable to receive such inputted authentication information or retrieve such information from the device's memory or central server 3, and, thereafter transmit such information to the device 500 being operated by the female user that originally created and sent the confirmation signal. In an embodiment, the authentication information sent by the male user (i.e., his device 700) may comprise a so-called "selfie" 701 which is an image of himself (either a real-time picture that is input, or a stored picture that is retrieved). The sending of the selfie assists the female user (or user that receives the selfie) to corroborate the fact that the profile she may have reviewed is indeed associated with the same user she is presently communicating with. In accordance with an embodiment of the invention, the authentication information must be received by the device 500 from the device 700 within a certain elapsed time (e.g., 60 seconds from the time the male user receives the confirmation) from the time the device 500 initially transmitted the confirmation signal to the device 700 in order to prevent a male user from establishing fake profiles before sending the authentication information to the device 500 of the female user. The process described above is part of an enhanced personal security process in order to give a female user (or any receiving user) confidence that the person they are interested in communicating with, or meeting, is in fact the person whose profile they have reviewed.

Once the device 500 operated by the female user has received the authentication information and sends acceptance information to the male user's device 700 (e.g., a selfie 702 of the female user, or message 703, see FIG. 7B) a communication link 5 (see FIG. 1A) may be established by, and between the two devices via a network communications provider or other type of link (e.g., wifi). The establishment of a link enables the two devices, and its users (the female and male user) to thereafter exchange communications 704*a-n* (see FIG. 7C) e.g., text messages (where "n" represents the last message) with each other. At this point, the identity and location 505 of the female user of device 500 may be presented to the male user of device 700. Alternatively, the location may be provided in an additional step after the female user sends additional information and/or signals to the authenticated male user.

Again, the requirement that a male user first send authentication information to a female user before the female user's identity (and location) is presented to the male user illustrates one of the enhanced personal security features provided by embodiments of the present invention. This feature may be referred to as an enhanced, "self-authentication" feature.

Figure 7B:
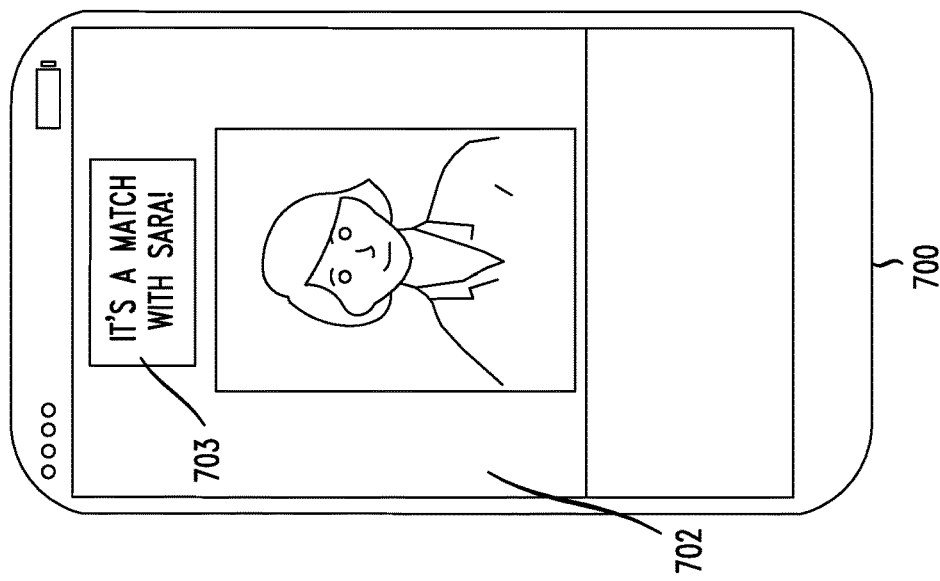
Figure 7C:
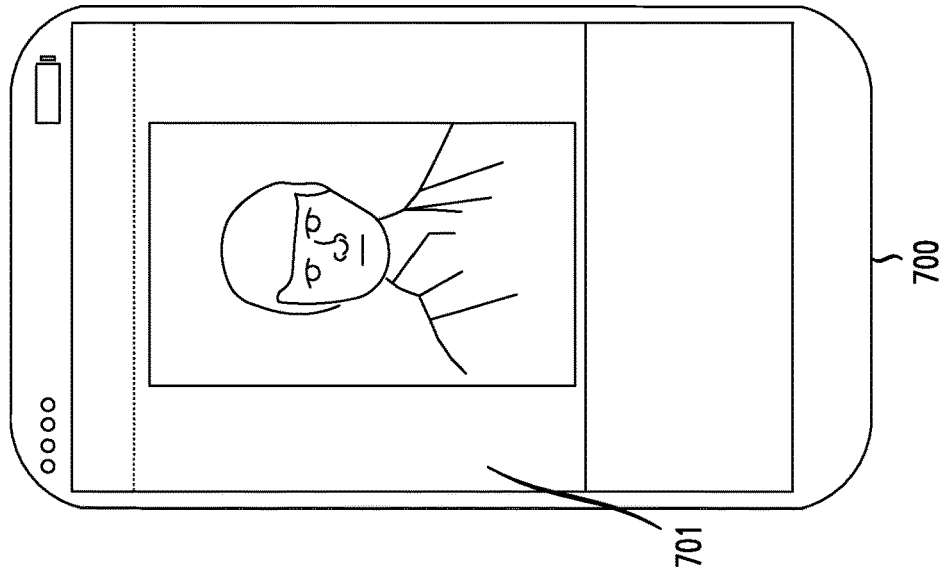

Further, as noted previously, other features described herein may be included in the embodiments depicted in FIGS. 7A to 7C (e.g., time or date indicators) but for the sake of simplicity and to avoid redundancy the inventors have refrained from repeating such features with respect to FIGS. 7A to 7C.

Figure 8:
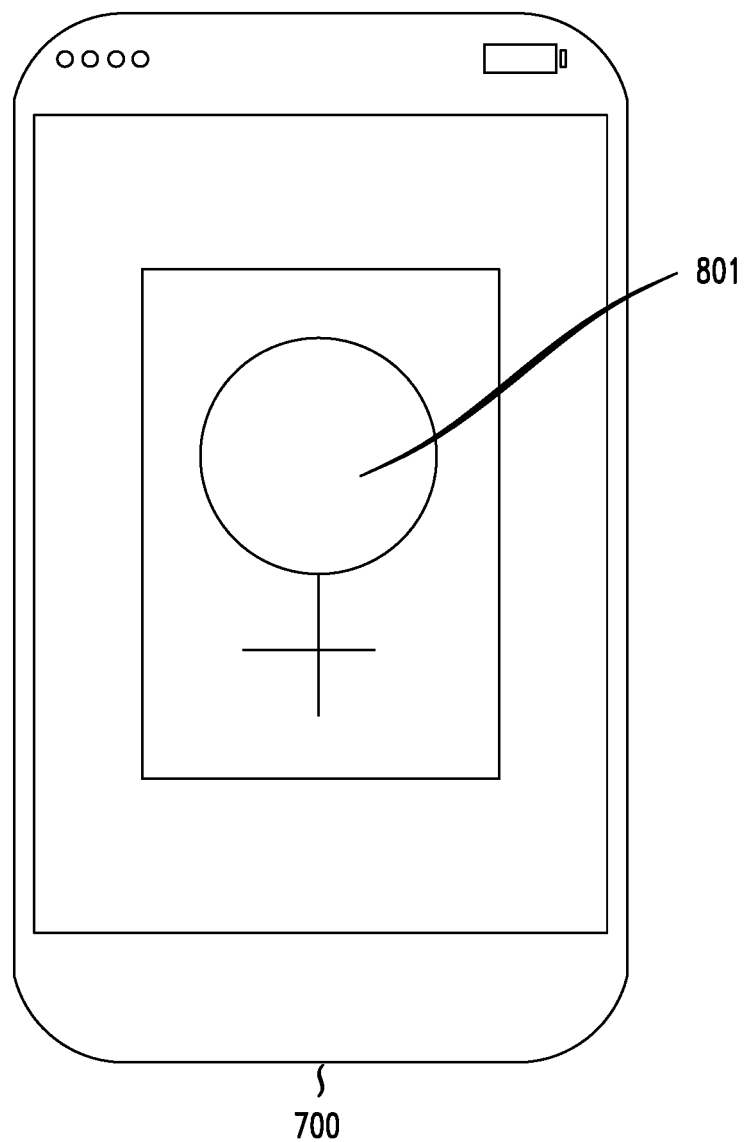
FIG. 8 depicts an exemplary message that may be displayed on a device operated by one user upon receipt of a communication from another user according to an embodiment of the present invention.

FIG. 8 depicts an exemplary message 801 that may be displayed on the device 700 of a male user upon receipt of the device 700 of a confirmation signal from a female user (i.e., her device 500). The message may result from a push notification or other type of confirmation signal being sent from the female user, Thereafter, the male user may respond with authentication information as described previously.

It should be understood that up until the time that the device 500 (device used by the female user) sends the confirmation signal the identity and profile of the female user remains anonymous to the male user of device 700.

Figure 9:
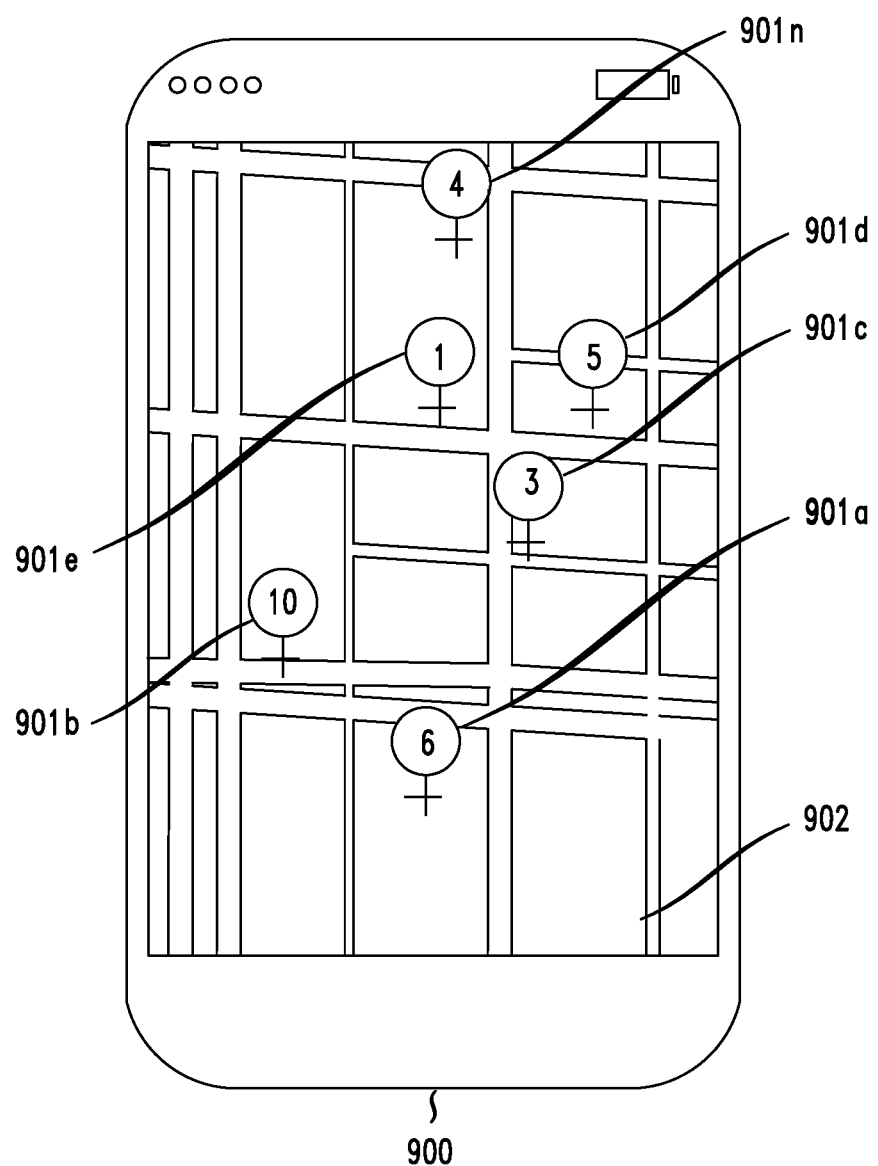
FIG. 9 depicts an exemplary display of a number of users that are within a certain selectable and adjustable geographic area according to an embodiment of the present invention.

Backtracking somewhat, and now referring to step 105*b* in FIG. 1 as well as FIG. 9, it should be understood that in embodiments of the invention, a device 700 operated by a male user that has been registered with a service operating in accordance with the principles of the present invention may be further operable to receive and display information regarding the number of anonymous female users 901*a-n* that are within a certain selectable and adjustable geographic area 902, such as an area surrounding where the male user is presently located, or may be located in the future. Each female user within an area 902 may be associated with an indicator (e.g., pin) displayed on device 700. Such an area 902 may be referred to as a "limited density area" ("limited area" for short) because unlike the density areas 402*a-n* presented to female users, the limited area 902 presented to a male user will not display or otherwise present specific information about female users 901*a-n* to the male user (e.g., the name, age, image, profile or exact address will not be displayed or presented). Accordingly, female users remain anonymous to male users. This feature adds to the high level of security provided by embodiments of the present invention.

The limited area 902 may be further divided into limited sub-regions, sub-areas or sub-divisions (hereafter "sub-divisions") and these sub-divisions may be displayed as distinct limited sub-divisions on the display of device 700. In addition, if the number of female users 901*a-n* within a limited area or sub-division exceeds or meets a first threshold value, the device 700 may be operable to display a limited area or sub-division outlined in a color (e.g., red). Conversely, if the number of female users 901*a-n* within a limited area or sub-division is below or meets a second threshold value, the device 700 may be operable to display a limited area or sub-division in a different color (e.g., blue). It should be understood that alternative indicators of the number (density) of female users 901*a-n* within a given limited area or sub-division may be used in addition to, or instead of, colors (e.g., a word that indicates "hi" or "low", or a symbol such as an exclamation point "!" or asterisk "*" or another type of symbol).

In more detail, the central server 3 may be operable to compute the number of current female users 901*a-n* and their current location and send such data and content to the device 700 where the device 700 uses the data to create and display the limited area 902 or sub-divisions.

Yet further, the limited area 902 may be based on estimates of the number of female users 901*a-n* expected to be within the area 902 at a given time or time period, on a given day. In more detail, a central server 3 may store historical data regarding the number of female users 901*a-n* that typically are found within a given geographical area. Thereafter, the central server 3 may be operable to compute estimated densities (i.e., forecasted densities) from the stored historical data, and send the forecasted data to the device 700. Upon receiving data and content from the central server 3, the device 700 may be operable to create a limited area 902 that represents an estimate of the number of female users 901*a-n* that are expected to be within a given geographical area at a certain time (for example, using indicators similar to indicators 404*a-n*) on a certain day, for example. In an embodiment, the device 700 (and its user) may be located nearby the area 902 and such a location may also be displayed on device 700. The user of device 700 can be remote from an area 902, in which case the display of the area 902 provides the user with increased knowledge as to those locations that the user may be interested in visiting in the future. In an alternative embodiment, if the user (e.g., male user) is not yet located within the vicinity of the area 902, the device 700 (e.g., using the APP stored on the device 700) may be operable to track the location of the male user using known methods (e.g., GPS methods) and display his location when the user is at a position that is nearby area 902. Alternatively, the user can enlarge the area surrounding the area 902 depicted on the display of device 700 in order to include his present location. The location of the male user with respect to the area 902 may be continually updated and displayed on device 700 using known GPS methods.

Though the male user of device 700 may not be able to see the identity of female users 901a-n, providing anonymous information to a male user may still permit a male user to understand where a large number of female users 901a-n are at a given time and place in order to meet such users.

Referring to step 106b in FIG. 1, in an embodiment of the invention, a male user may input information or otherwise select a pushbutton or icon, for example, that is displayed on, or made a part of, device 700 to generate an echo request signal ("echo request signal" or just "request signal"). Upon receiving such input from the selected pushbutton or icon, the device 700 may be operable to generate a request signal that includes information that identifies the location, identity (e.g., authentication selfie) and profile, for example, of the male user of device 700 (and sends this request signal via a network communications channel or link 4a,4b (see FIG. 1A) or via similar means (e.g., wifi) to female users within a variable echo area. In one embodiment, the request signal may take the form of a push notification that will eventually be presented on the display of a device 500 (female use's device) at the top, for example.

In one embodiment, the variable echo area may comprise the limited area 902 that includes female users 901a-n. In another embodiment, the variable echo area may be a sub-division of area 902. In yet another embodiment, the variable echo area (i.e., area within which is sent a request signal) may comprise an area larger than the limited area 902. Still further, the variable echo area may comprise a plurality of distinct limited areas, each of which is sent the request signal and each of which includes a number of female users (not shown in figures for the sake of clarity). Thus, in embodiments of the invention the area that receives the request signal may be varied by the male user. Further, the request signal sent from device 700 may be generated prior to the display of the number of female users 901a-n in a limited area 902.

Figure 10A:
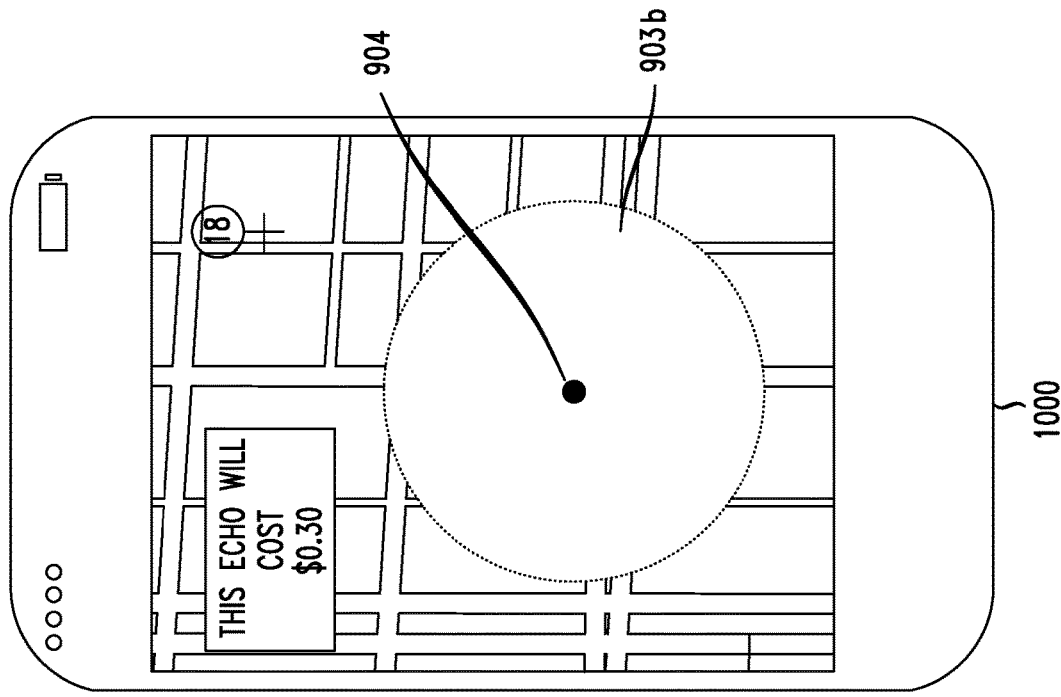
FIGS. 10A and 10B depict exemplary indicators, where each indicator may be associated with a particular area within which a request may be sent from a device operated by a user in accordance with an embodiment of the present invention.
Figure 10B:
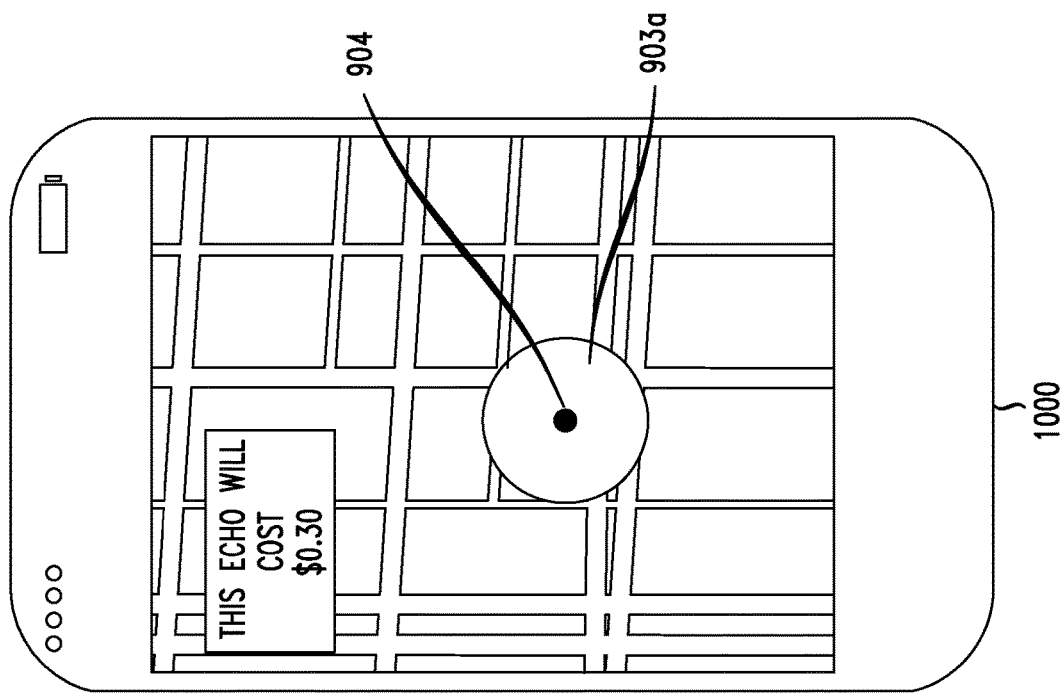

Referring now to FIGS. 10A and 10B there are depicted exemplary, variable echo area indicators 903a and 903b. In one embodiment, each of the indicators 903a and 903b is associated with a particular area within which a request signal may be sent from the device 700 operated by a male user. The device 700 may be operable to provide the indicators 903a,903b on the display of the device 700, and provide the male user the ability to vary the size of the indicator in order to vary the size of the geographical area to which a request signal will be sent (e.g., the larger the area, the higher the probability that the request signal will be received by more users). In the exemplary embodiments depicted in FIGS. 10A and 10B, the indicators 903a,b are 2-dimensional circular, highlighted indicators though it should be understood that this is merely one way to depict the size of the geographical area within which an echo request will be sent. Other indicators may have 3-dimensional shapes, may comprise other geometric shapes (e.g., square-shaped indicators, triangular-shaped, etc.). In an embodiment, the device 700 may include a touch-screen display whereupon when a portion of an area 903a,b is touched by a male user, the device 700 is operable to adjust the size of the area 903a, b displayed to the user in accordance with the motion of the user's touching (fingers, stylus). For example, if the user's motion indicates the area should be smaller or larger, then the device will detect and receive this motion as an input signal and adjust the size of the indicator 903a,b accordingly. It should be understood that a touch-screen display is only one way in which an echo area 903a, b may be varied. Other methods may include the use of voice commands input into the device 700, or the use of pre-set sizes of an echo area that are input by a user through a separate features menu or based on default sizes that are provided as a part of the APP stored on the device 700, to name just a few of the ways in which the size of the echo area may be varied.

In an embodiment, the central server 3 may control the size of the echo area. For example, a male user may be restricted to sending a request signal within a certain area (e.g., if a male user lives 7 miles from a downtown, he will have pay for the service of sending the request signal all the way to downtown area). A service provided by the central server 3 may require the user to pay for sending such a request signal, where the cost may be based upon the distance the request signal is sent.

For the sake of clarity, the displays depicted in each figure herein are shown separately. However, it should be understood that each of the displays, and features shown within each display, may be combined and displayed simultaneously (e.g., certain features of one display may be combined with certain features of another display). For example, the limited area 902 (and any sub-divisions) may be displayed along with a variable echo area 903a,b as one display on device 700.

Though an echo area has been described with respect to a male user, similar methods may be used by female users if so desired. By transmitting their profile (in the case of a male user) or presence (but not their identity initially, in the case of a female user) within a specific geographical area, such a user is controlling the area within which their profile will be active (i.e., within which they desire to meet someone). The area may consist of a few square meters (e.g., a radius of 10 meters when the area is represented as circular), a few city blocks, or an entire metropolitan area (e.g., many square kilometers or miles). In addition to providing users with the ability to vary the area within which they wish to meet another user, the present invention provides for a plurality of notifications. For example, in one embodiment a device 500, 700 may emit or otherwise output an alarm or audible tone or signal (e.g., music) when a user is nearby a limited area 902 or map/grid 502 in order to notify the user he or she is getting closer to such an area or map/grid. Similarly, an audible sound or other alarm may be output by a device 500, 700 when the user moves to a location that is not nearby or within the area 902 or map/grid 502.

In yet additional embodiments, the map/grid 502 and limited area 902 may be varied by the user of device 500,700 (or may be pre-set to vary) depending on the time of day and/or day of the week in order to ensure that the user can control his or her ability to meet other users only within certain areas, at certain times and on certain days of the week, or months of the year.

In step 107 of FIG. 1, a device, such as the device 500 (e.g., one operated by a female user), that receives a request signal from device 700 within a variable echo area may be operable to display some or all of the information in the received request signal on the screen or other output means of the device 500 so that the user (e.g., female user) may view the identity, profile, selfie, etc., of the male user that originated the request signal to decide whether to respond to the request signal. In an embodiment of the invention, if the user that receives the request signal is interested in communicating with the originator of the request signal, such a user may input or otherwise select a response to be sent to the originator of the request signal. In one embodiment, the response may comprise a confirmation signal (echo confirmation signal) described previously above or may include additional information that the responding user wishes to share with the originator, such as a profile or selfie of the female responder. Notably, however, a profile, selfie or other specific information regarding a responding user (e.g., a female user) is kept confidential until the user herself authorizes disclosure of the information by, for example, sending a confirmation signal and receiving authentication information from a male user (e.g., a selfie).

While the discussion above has set forth some non-limiting examples of the present invention, other equivalent techniques, processes and devices may be substituted for those presented. For example, all inputs described herein may be completed using voice commands that are received by a device and converted into respective instructions by necessary circuitry, instructions and data within the respective devices. Further, though the invention has been described with respect to female and male users, it should be understood that the scope of the present invention encompasses embodiments that include only male users and/or only female users. In the case where communications are between just male users, or just female users, the present invention provides for a plurality of modes. For example, a user of a device that includes an APP or other stored instructions for completing features of the invention described herein may activate such features as an "anonymous" user in a first mode by, for example, inputting information into a device or selecting a mode that is presented to the user to activate an anonymous mode of operation. In an anonymous mode of operation, the features related to anonymous users (i.e., female users) described herein will apply to such a user. Alternatively, a user may select a second mode that will reveal their identity, profile, etc., in which case the features related to remaining anonymous described herein would not apply to such a user. In sum these alternative or substituted techniques, processes and devices are also considered within the scope of the present invention.

I claim:

1. A method for contacting users within a variable and limited density area comprising:
    receiving information, on a user's electronic device, regarding an estimated number of anonymous users within each of one or more variable and limited density areas executing a set of instructions comprising an anonymous mode of a location application of the anonymous users at a certain time, wherein the information does not include specific information about the anonymous users and is based on stored historical data for each density area;
    displaying one or more indicators of the one or more variable and limited density areas on the user's electronic device where a first indicator represents the number of anonymous users exceed a first threshold value within one of the one or more variable and limited density areas and where a second indicator represents the number of anonymous users falls below a second threshold value within one of the one or more variable and limited density areas;
    varying a representative, geographical size of one of the one or more limited density areas on the user's electronic device;
    selecting a date, time or time frame to send a request signal to one of the anonymous users prior to, or after the display of the indicators within the one or more varied limited density areas, wherein the request signal comprises information that identifies the location, identity and profile of the user of the user's electronic device; and
    outputting an alarm from the user's electronic device when the user is nearby one of the one or more variable limited density areas or when the user moves to a location that is not nearby or within one of the one or more variable limited density areas.

2. The method as in claim 1, further comprising creating or accessing a user profile, wherein the profile comprises a plurality of text, images, videos and audio content.

3. The method as in claim 1 further comprising:
    displaying a map on the user's electronic device that comprises the one or more variable and limited density areas, and the number of anonymous users within each density area.

4. The method as in claim 3, further comprising displaying a location of the anonymous users on the map.

5. The method as in claim 1, further comprising:
    receiving signals from a central server, where the signals comprise data or content representative of the estimated number of anonymous users expected to be in the one or more variable and limited density areas at a certain time executing a set of instructions comprising the anonymous mode of the location application, wherein the information does not include specific information about the anonymous users and is based on stored historical data for each density area.

6. The method as in claim 5 further comprising varying the size of a displayed indicator.

7. The method as in claim 5 further comprising outputting a signal from the user's electronic device indicating the user's electronic device is nearby one of the one or more variable limited density areas or not nearby one of the one or more variable and limited density areas.

8. The method as in claim 1 wherein the user's electronic device is a male user's electronic device.

9. The method as in claim 1 wherein the anonymous users comprise female users.

10. The method as in claim 1 wherein the specific information comprises the name, age, image, profile or exact address of the anonymous users.

* * * * *